Nov. 1, 1938.   K. C. ALLISON   2,134,772
METHOD OF AND APPARATUS FOR DISPENSING FLUIDS
Filed Jan. 25, 1934   3 Sheets-Sheet 1

INVENTOR.
KENNETH C. ALLISON
By Chindahl, Parker & Carlson
ATTORNEYS

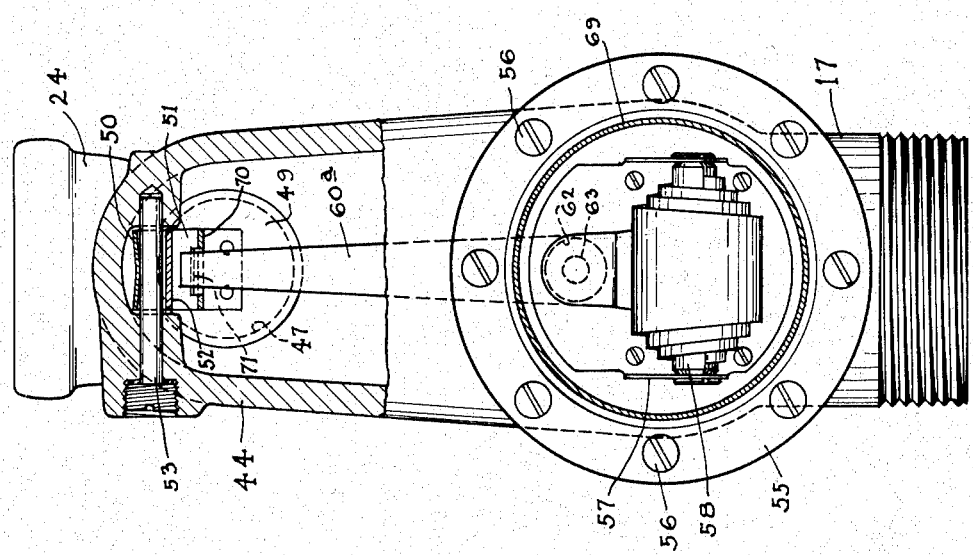
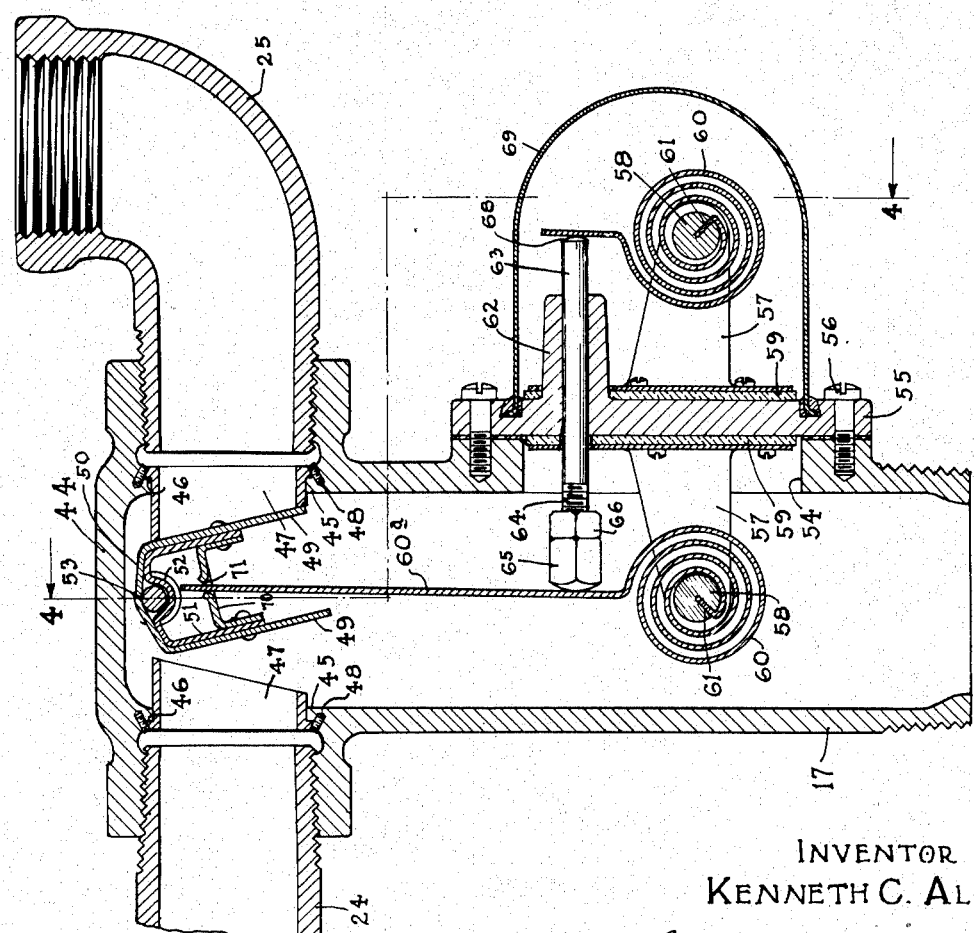

Nov. 1, 1938.  K. C. ALLISON  2,134,772
METHOD OF AND APPARATUS FOR DISPENSING FLUIDS
Filed Jan. 25, 1934   3 Sheets-Sheet 3

INVENTOR
KENNETH C. ALLISON
By Chindall, Parker & Carlson
ATTORNEYS

Patented Nov. 1, 1938

2,134,772

UNITED STATES PATENT OFFICE 2,134,772

METHOD OF AND APPARATUS FOR DISPENSING FLUIDS

Kenneth C. Allison, Arlington Heights, Ill.

Application January 25, 1934, Serial No. 708,201

15 Claims. (Cl. 221—95)

The invention relates to a method of dispensing fluids and to an apparatus therefor wherein fluid is delivered from a supply tank in measured increments as, for example, in the vending of gasoline to the consumer.

In dispensing fluids, such as gasoline, the fluid is generally drawn from a supply tank which is underground. Where the tank is so located, the temperature of fluid therein almost invariably differs from atmospheric temperature and is usually lower. Hence, the volume of a unit quantity by weight of fluid which is transferred to the tank at atmospheric temperature will vary as its temperature becomes that of the tank and if the temperature change is a decrease the volume of the unit quantity will likewise decrease. That is to say, a given weight of fluid having a volumetric measure of one gallon at one temperature will be less than one gallon at a lower temperature, due to the increase of the specific gravity and density of the fluid as the temperature thereof decreases. Consequently if the fluid is drawn from the tank and dispensed at tank temperature a loss occurs which, over a period of time, is quite substantial.

An object of the invention, therefore, is to provide a novel method of dispensing fluid wherein the fluid which is drawn from the supply tank is dispensed only after it has approximately attained the same specific gravity as that of the fluid at the time it was placed in the tank whereby the unit volumes of the fluid originally received and finally dispensed are substantially the same.

Another object is to provide a method of dispensing fluid which includes the step of raising the temperature of the fluid before it is delivered whenever the temperature of the fluid from the supply tank is less than atmospheric temperature.

Another object of the invention is to provide a novel means for automatically correcting the volumetric measure of a unit quantity of fluid from a supply tank to correspond with the volumetric measure of the same unit quantity when the fluid was originally placed in the tank.

A further object resides in the provision, in a fluid dispensing apparatus, of novel means which is automatically operable, when the volume of a unit quantity of fluid has diminished because of a lowering of the original temperature of a fluid placed in a supply tank, to return the volume per unit quantity substantially to its original value before delivering the fluid.

More specifically stated another object is to provide a novel fluid dispensing apparatus for delivering fluid from a storage tank which embodies means automatically operable to deliver fluid directly from the tank when the temperature of the fluid is substantially that of the atmosphere and for diverting the fluid through and retaining it in an expansion and heat transfer chamber when the temperature of fluid from the storage tank is less than that of atmosphere whereby the fluid temperature may be raised to that of the atmosphere before the fluid is dispensed.

Another object of the invention is to provide a novel control mechanism for detecting a variation of volume of a unit quantity of fluid which is automatically responsive to direct the flow of the fluid through an expansion means when the original fluid volume per unit quantity has diminished.

A further object is to provide a novel expansion chamber wherein separation of air and other gas from the fluid may occur prior to delivery of the fluid.

Another object is to provide a heat transfer and air separation chamber which is adapted to permit exapnsion of the fluid in the system without materially increasing the pressure produced by the fluid in the system, and which embodies structural arrangements for increasing the efficiency of air separation in the chamber.

Other objects and advantages will become apparent in the following description and from the accompanying drawings, in which Figure 1 is a side elevation on a reduced scale of an apparatus embodying the features of the invention, the outer casing being in section.

Fig. 3 is an axial section through a part of the apparatus in illustration of the control mechanism structure.

Fig. 4 is an irregular sectional view through the control mechanism taken as indicated by the line 4—4 of Fig. 3.

Figure 1:
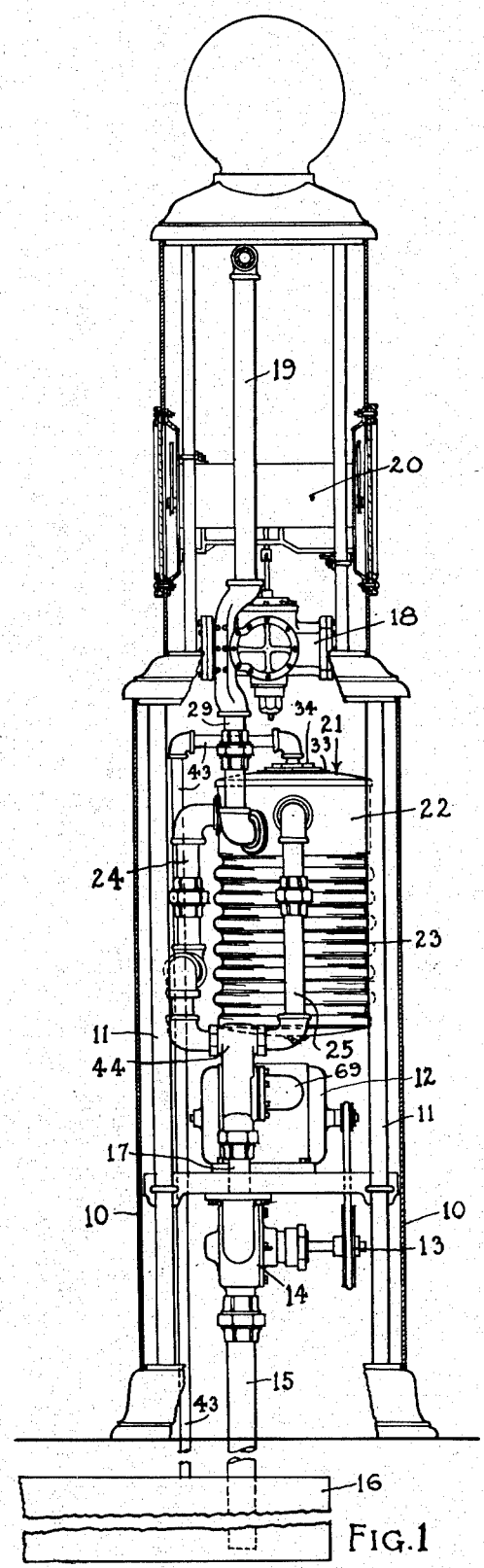

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

I have chosen for illustrative purposes to show the features of the present invention in connection with a gasoline dispensing apparatus of more or less conventional design. With reference to Fig. 1, 10 designates generally an upright casing of any suitable form which encloses an upright supporting frame 11. Mounted on the frame within the casing is power driving means, such as an electric motor 12, connected by a drive belt and pulley 13 with a suitable pump which is not shown but is located in the pump casing 14.

The pump is arranged to draw the fluid to be dispensed, for instance gasoline, through a feed pipe 15 which extends downwardly from the casing to communicate with a supply tank diagrammatically indicated at 16 and usually located a substantial distance below ground level. The pump delivers fluid under pressure through a conduit 17 toward a delivery point and the flow system usually includes a suitable metering device 18 which measures the amount of fluid delivered to a discharge pipe 19 and indicates the quantity of fluid so delivered on an indicator device 20.

The violent agitating effect which the pump has on the fluid liberates previously absorbed air and other gases and it is desirable to effect a separation thereof from the body of fluid before the fluid is metered. Moreover, temperature changes in the fluid in the flow system are apt to result in comparable changes of the internal pressure within the system. Means wherein the air and gas may separate from the main body of the fluid is, therefore, provided in the nature of a separating chamber which furthermore is fashioned for expansion and contraction in accordance with the variations of internal pressure in the flow system.

Figure 6:
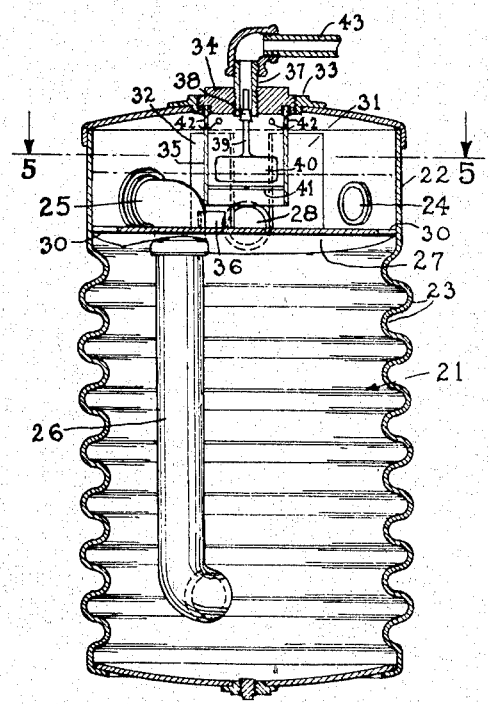
Fig. 6 is a longitudinal sectional view through said chamber looking in the direction indicated by the arrows on the line 6—6 of Fig. 5.

With particular reference to Figs. 1 and 6, one suitable form of chamber is shown as comprising a sealed container 21 having a cylindrical upper portion 22 and a corrugated lower portion 23. The conduit 17 leading from the pump is divided into two branches 24 and 25, both of which lead into the upper portion 22 of the chamber. One of the conduits, in this instance the conduit 24, discharges into said upper portion, while the other conduit 25 is turned downwardly within the chamber to extend through a continuation 26 nearly to the bottom of the chamber where it terminates in a laterally directed bend discharging substantially tangentially of the adjacent wall of the chamber. The purpose of the branch conduits will be hereinafter more fully described.

Figure 5:
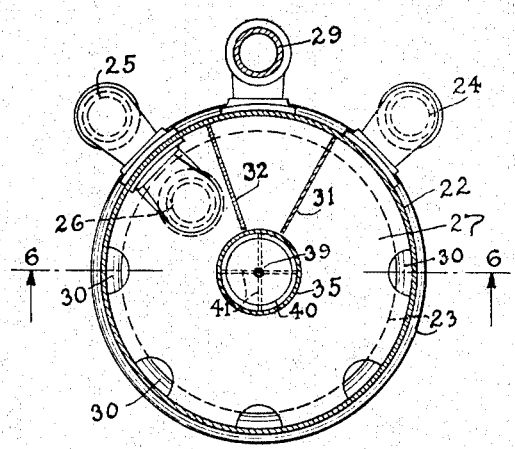
Fig. 5 is a transverse sectional view through the head portion of the expansion and heat transfer chamber taken along the line 5—5 of Fig. 6.

Separating the upper and lower portions 22 and 23 of the chamber is a separator or baffle plate 27 which is secured in place at a relatively gentle angle to a plane which is normal with respect to the axis of the chamber. At the lower edge of the plate 27 and communicating with the upper portion 22 of the chamber is an outlet port 28 in communication with a pipe 29 (Fig. 1) leading to the metering device 18. The higher edge of the plate 27 opposite the port 28 has a series of peripheral apertures 30 (Fig. 5) providing passageways between the lower and upper portions of the chamber. On each side of the port 28 is a vertical partition or baffle 31, 32 which extends inwardly from the wall of the chamber in generally radial planes. The top wall of the chamber is provided with a flanged aperture 33 which is closed by a plug 34 having screw threaded engagement therewith, and the plug carries a sleeve 35 arranged to extend inwardly of the upper portion of the chamber in substantially concentric relation to the wall of the chamber and to a point spaced a short distance above the separator plate 27.

The baffles 31, 32 and the sleeve 35 cooperate in preventing a flow of fluid directly from the branch conduit 24 to the outlet port 28 and cause the fluid discharging from the conduit 24 to travel across the transverse partition 27 with a circular movement whereby to facilitate the separation of air and gas from the body of the fluid. The partition 32, which is remote from the discharge mouth of the conduit 24, has an aperture 36 in its lower edge to facilitate passage of fluid to the port 28 after the fluid has traveled its circular course. Similarly, fluid discharging through the branch conduit 25 and extension 26 is for the same purpose given a circular whirling motion by the turned lower end of the extension.

The sleeve 35 is in the nature of a cage for supporting a valve mechanism in control of an exhaust vent leading from the upper chamber. Thus, the plug 34 is centrally apertured to receive a tube 37 which communicates with the interior of the chamber substantially at its highest point. The inner end of the tube 37 is finished to provide a seat for a valve 38 carried by a valve stem 39 which, in turn, is mounted on a suitable float 40. Such means as cross wires 41 limit the downward movement of the valve structure. A circular series of apertures 42 in the upper portion of the sleeve provide passageways for the escape of air and gas through the vent provided by the tube 37.

The outer end of the tube 37 is connected with a conduit 43 (Fig. 1) which preferably returns to the supply tank 16 to prevent the loss of vaporized fluid. Thus, the upper portion of the chamber is vented to allow the separated air and gas to pass therefrom and the upper limit of the valve assembly generally defines the normal fluid level within the chamber and provides a pressure absorbing air cushion at the top of the chamber.

It will be seen that the chamber is supported entirely from its upper portion by the several conduits which communicate therewith, thus leaving the lower and corrugated portion entirely free. This portion of the chamber is fashioned for limited expansion. Hence, should the internal pressure within the chamber and in the flow system leading to and away from said chamber increase, the lower portion is free to expand whereby to minimize the effect of such internal pressure. Such expansion together with the pressure absorbing air cushion at the top of the chamber serves to prevent damage to the mechanism as a whole by excessive internal pressure and in particular will eliminate the failure of packing material to prevent leakage.

The mechanism by which the volume of the fluid being dispensed is so controlled that loss due to a shrinkage of the fluid because of an increase in its specific gravity or density is eliminated will be described with reference to Figs. 1, 6, and particularly Figs. 3 and 4. Conduit 17 leading from the pump terminates in a T-shaped head 44 for connection with the ends of branch conduits 24 and 25. The passageways in the head with which said conduits communicate are defined by internal annular flanges 45 which cooperate with annular flanges 46 formed on short sleeves 47 to locate the sleeves in place. These sleeves are secured to the head in any suitable manner as by screws 48 and are axially alined with their mouths in opposed spaced relation.

The fluid flow through conduit 17 into one or the other of the branch conduits 24 and 25 is controlled by a suitable valve mechanism. In the present embodiment such a mechanism comprises an oscillatory valve structure arranged to be swung into closing relation to the mouth of one or the other of the sleeves 47. As shown in Fig. 4, a preferred form of valve mechanism comprises a U-shaped structure having disk-shaped legs 49 which are connected by a base member 50. The disk-like legs are arranged for abutment against the open mouths of the sleeves 47 to close them. Fitted within and secured to the valve structure is a second U-shaped member 51 having a bend 52 in its base portion which, when the parts are assembled, cooperates with the base 50 of the valve structure to provide a bore through which a pivot pin 53 extends. The base 50 may be slightly bent as shown to provide a bore which is more nearly circular than semi-circular and the parts are so dimensioned that the valve structure is supported rather loosely on the pivot pin 53 whereby to allow either one of the disk-shaped legs 49 to adapt itself to a properly seated condition over the mouth of its associated sleeve 47. If desired, the cooperating parts forming the bore through which the pivot pin 53 extends may be bent or cut away in such manner that the bore flares outwardly from the center (see Fig. 4) in order further to increase the freedom of movement of the valve structure in adapting itself properly to its seat. The inner edges of the sleeves 47 are formed on an angular plane as may be seen in Fig. 3 to locate the mouths of said sleeves for proper cooperation with the opposed legs 49 of the valve structure.

In the present instance, a shrinkage in the volume of the fluid within the supply tank is detected by thermally responsive means which is adapted to direct the flow of fluid through one or the other of said branch passageways in order that such shrinkage may be eliminated as will hereinafter be described. One preferred form of structure comprises the following arrangement of parts: A side wall of the conduit 17 is apertures as at 54 (Fig. 3) and this aperture is closed by a traversing base plate 55 which is rigidly secured as by screws 56 in fluid-tight relation to the conduit 17. Secured to each side of the base 55 is a bracket 57 having outstanding arms between which a stud 58 is rigidly secured. A layer of heat insulating material 59 is preferably interposed between the bracket 57 and the base 55.

The studs 58 carry thermal responsive elements 60 which are herein shown as being in the form of spirally wound bimetallic strips. These elements are firmly secured through their inner ends as at 61 to the studs 58 and their outer ends are turned to extend from the elements in the same direction and in substantially parallel relation. The base 55 has an elongated boss 62 thereon providing a snug sliding bearing for a connecting rod 63 which is interposed between the parallel ends of the thermal responsive elements 60. As may be seen in Fig. 4 the elements are oppositely mounted on the studs 58 so that the forces exerted thereby are opposed through the interposed connecting rod 63.

One end of the rod 63 is screw threaded, as at 64, to receive a nut 65 and a lock nut 66. Preferably the face of the nut 65 which bears against the element 60 is rounded to provide a frictionless, substantially universally movable connection therebetween. The nut 65 and lock nut 66 provide means for adjusting the relationship of the opposed thermally responsive elements. The opposite end of the rod 63 is also rounded, as at 68, for substantially frictionless engagement with the end of the cooperating element. Preferably the element 60, which is located outside of the conduit 17, is enclosed by such means as a thin walled casing 69 which is carried by the base 55. The connection between the casing 69 and the base is fluid-tight so that the compartment within the casing may be filled with a light oil or the like substantially to prevent leakage from the conduit 17 along the rod 63.

The structural arrangement which has just been described disposes one of the thermally responsive elements 60 in the path of flow through the conduit 17. The outer end thereof is extended, as at 60ª, to a point intermediate the legs 49 of the valve structure. A transverse wall 70, connecting the opposed legs of the valve structure and spaced from the base, is slotted, as at 71, in a direction paralleling the axis of the pivot 53. This slot receives the extended end of the element 60 and the margins of the slot are preferably turned or otherwise suitably formed to provide knife edges for engagement with the element. Moreover this connection is somewhat loose to introduce a limited amount of play and thereby provide a connection which cannot bind.

In setting the mechanism for operation, the nut 65 on the connecting rod 63 is so adjusted that the end 60ª of the internal thermally responsive element 60 sets the valve structure to a position intermediate the inlet mouths of the branch conduits and the thermally responsive elements are so arranged that in this position of the valve the forces exerted by the elements are substantially balanced against each other. The thermally responsive elements moreover are so arranged that when the element 60 in the conduit 17 is subjected to a lower temperature than that to which the outer element is exposed, the valve structure will be shifted toward a position to prevent a flow through the branch conduit 24. On the other hand, when the temperature within the conduit 17 is higher than the external temperature, the differential of temperature is effective to swing the valve structure toward a closing relation with the mouth to which the branch conduit 25 is connected. When the valve structure is inclined toward one or the other of said mouths the first rush of fluid will swing the valve the remaining distance and force it tightly into seated relation therewith.

When the valve mechanism occupies the position shown in Fig. 3, the flow of fluid is into the top of the chamber and the fluid always follows this path when its temperature is higher than or equal to that of atmosphere. When the valve mechanism occupies the opposite position the flow is into the bottom of the chamber and the fluid always follows this path when its temperature is lower than that of atmosphere. In other words, whenever the volume of the fluid drawn from the supply tank is less than the volume it would have at atmospheric temperature, because of shrinkage due to its greater specific gravity or density at lower temperatures, the fluid is directed to the bottom of the chamber before it is delivered to the dispensing point. Such fluid is retained in the chamber and because of the corrugated formation of the lower portion of the chamber, a rapid heat transfer takes place whereby to raise the temperature of the fluid within the chamber and thus increase the volume of the fluid. The heat transferring action is increased to some extent by discharging the fluid into the bottom of the chamber with a circular whirling motion. Subsequently, as additional fluid is drawn from the supply tank and discharged into the bottom of the container, the warmed and expanded fluid already in the tank is forced upwardly to discharge through the pipe 29, metering device 18 and discharge pipe 19.

If the temperature of the fluid is higher than atmospheric temperature, the valve controlled thermally responsive mechanism is actuated to prevent a flow through branch conduit 25 and to direct a flow through branch conduit 24. Consequently practically all of the fluid passes directly through the tank and the volume of such fluid cannot decrease because of a lowering of its temperature.

It will be evident from the foregoing that the tank as shown is in reality two units combined into one i. e., an air eliminator (upper portion) and an expansion and heat transfer chamber (lower portion). The two portions of the tank could be separated into two structurally independent units without effecting the system in any way. The point is that the air elimination unit should always be in operation while the expansion chamber should be cut out when the air is colder than the fluid. Thus, it is immaterial whether or not the two units are combined or are in two separate housings.

Figure 2:
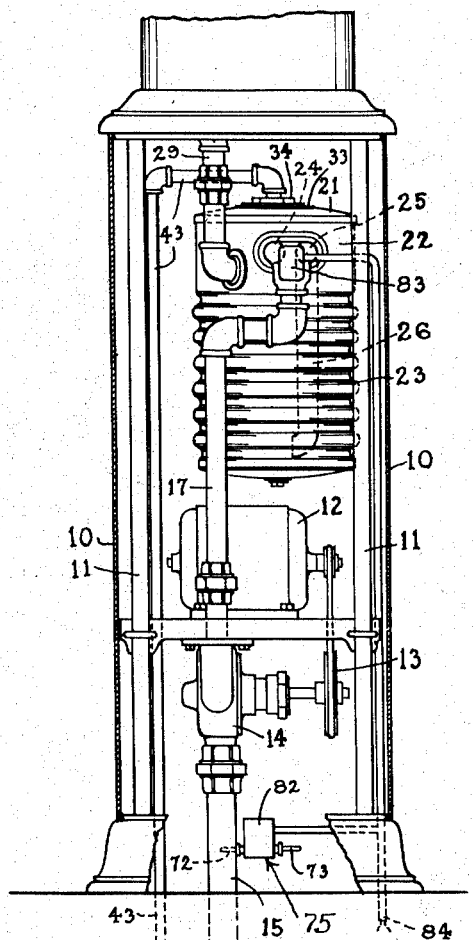
Fig. 2 is a similar, but fragmentary view, showing an apparatus embodying a modified control mechanism.
Figure 7:
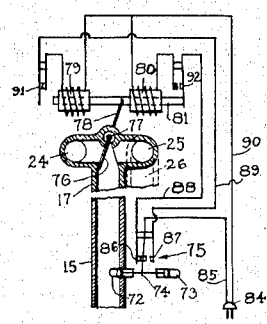
Fig. 7 is a somewhat diagrammatic view showing the arrangement of parts and a wiring diagram of the control mechanism in the modified form shown in Fig. 2.

The modified structure shown in Figs. 2 and 7 is illustrative of an electrically controlled valve mechanism for directing the flow of fluid through branch conduits 24, 25. Referring to Fig. 2, a thermally responsive device 72 is located in the path of flow through the feed pipe 15. An oppositely acting thermally responsive unit 73 is exposed to atmospheric temperature. As shown in Fig. 7 the opposed elements 62 and 73 are connected to the movable contact 74 of a switch 75.

A valve 76 located at the juncture of the branch conduits 24 and 25 with conduit 17 is mounted on a rock shaft 77 to which an actuating arm 78 is connected. The position of the arm 78 is arranged to be controlled, in this embodiment, by electromagnetic windings 79 and 80 which exert their electromagnetic force on a common core or armature 81 to pull the core longitudinally in one direction or the other, depending upon whichever winding is energized. The actuator 78 is pivotally connected to the armature 81. As shown in Fig. 2, the switch 75 and its associated parts is located in a vapor-proof case 82, while the actuating means for the valve 76 is located in another vapor-proof case 83.

The preferred electrical control circuit is as follows: From one terminal of a plug 84, by which connection with a suitable source of current is established, a lead 85 leads to the movable contact 74 of the switch 75. This contact is arranged to engage one or the other of a pair of contacts 86, 87 disposed on opposite sides of the movable contact 74. One of the contacts 86 is connected through a lead 88 with an end of one of the electromagnetic windings, in this instance the winding 86. The other contact 87 is similarly connected through a lead 89 with one end of the other electromagnetic winding 79. The free ends of both electromagnetic windings 79, 80 are connected to a common lead 90 which returns to the other terminal of the plug 84. Preferably, switches 91, 92 are interposed respectively in the leads 89 and 88 to the electromagnetic windings 79 and 80 respectively, and these switches are arranged to be opened to break the circuit through the energized one of the electromagnetic windings by the movement of the armature 81 in response to the energization of that winding.

As in the case of the magnetically actuated mechanism for controlling the valve structure, 10 the thermally responsive elements in the electrical control are so balanced against each other that when the temperature of the fluid from the supply tank is lower than atmospheric temperature the contact 74 is swung to establish a circuit through lead 85, contacts 74, 87, lead 89, switch 91, winding 79 and lead 90 to direct the fluid through branch conduit 24. As the armature 81 is moved to position the valve 76 for directing this flow, it opens the switch 91 and breaks the energizing circuit of the windings 79. Similarly, when the fluid temperature is at least equal to that of atmosphere, the contact 74 closes a circuit to energize the other electromagnetic winding 80 and causes the fluid to flow through branch conduit 2″. The expansion of the fluid within the chamber 23 to its original volume occurs in the chamber 23 in the manner which has previously been described.

Now considering that the device is applied, as illustrated, to the gasoline dispensing pump of a filling station, the gasoline is usually delivered to the station by tank trucks and is therefore at atmospheric temperature. When the gasoline reaches the supply tank it quickly cools to a temperature which usually is substantially below that of atmosphere with a consequent shrinkage of the volume of the gasoline per unit quantity. When the dispensing apparatus or gasoline pump is equipped with mechanism embodying the present invention, the shrinkage of the gasoline drawn from the storage tank is, in effect, detected and the gasoline is delivered to and retained in the chamber 23 wherein its volume per unit quantity is increased substantially to equal the volume per unit quantity of the gasoline which was originally placed in the tank. On the other hand, whenever the temperature differential is such that no shrinkage has occurred, or if the delivery of fluid into the bottom of the chamber would result in a shrinkage of the volume of the fluid in the chamber, the valve controlling mechanism causes the fluid to be delivered directly to the dispensing point. As a consequence, loss to the owner of the filling station due to the shinkage of the fluid is eliminated.

I claim as my invention:

1. A fluid dispensing apparatus comprising, in combination, a supply tank for fluid, a pump, a heat transfer and expansion chamber, a flow system connecting said tank with said pump and including branch conduits discharging into the upper and lower portions of said chamber, a discharge conduit leading from the upper portion of said chamber, valve means for directing the flow of fluid through one or the other of said branch conduits, and means for controlling the position of said valve means including thermally responsive means for detecting a temperature differential between fluid from said tank and atmosphere, and means controlled by said thermally responsive means for setting the valve to direct fluid into the lower portion of said chamber when the fluid temperature is lower than that of atmosphere and into the upper portion of said chamber when the temperature differential is otherwise.

2. A fluid dispensing apparatus comprising, in combination, a supply tank for fluid, a pump, a heat transfer and expansion chamber, a flow system connecting said tank with said pump and including branch conduits discharging into the upper and lower portions of said chamber, a discharge conduit leading from the upper portion of said chamber, valve means for directing the flow of fluid through one or the other of said branch conduits, and means for controlling the position of said valve means including a thermally responsive element in the system leading to said chamber, a second thermally responsive element exposed to atmospheric temperature, means connecting said elements in force opposing relation, and means operatively connecting said thermally responsive elements with said valve for adjusting said valve to direct a flow through the branch conduit into the lower portion of said chamber when the temperature within the system is lower than atmospheric temperature.

3. A fluid dispensing apparatus comprising, in combination, a supply tank for fluid, a pump, a heat transfer and expansion chamber, a flow system connecting said tank with said pump and including branch conduits discharging into the upper and lower portions of said chamber, a discharge conduit leading from the upper portion of said chamber, valve means for directing the flow of fluid through one or the other of said branch conduits, and means for controlling the position of said valve means including a thermally responsive element in the system leading to said chamber, a second thermally responsive element exposed to atmospheric temperature, an electrically controlled actuator for said valve means and a circuit for said actuator having circuit controlling means operatively connected with each of said thermally responsive elements and arranged to operate said actuator in accordance with the temperature differential between said two thermally responsive elements, said actuator and valve being adjusted to direct a flow to the lower portion of said chamber when the temperature in the system is lower than atmospheric temperature.

4. A fluid dispensing apparatus comprising, in combination, a supply tank for fluid, means for delivering fluid from said tank including a flow system having a heat transfer chamber therein, and means automatically responsive to variations in the temperature of the fluid for directing fluid into said chamber and retaining it therein prior to delivery when the volume per unit quantity of fluid from the tank is less than the volume of the same quantity of fluid at atmospheric temperature.

5. In a fluid dispensing apparatus, the combination of a supply tank, dispensing means for withdrawing fluid from said tank and delivering the same to a discharge point, said means including heat transfer means and a pair of flow paths one path being adapted to convey fluid through said heat transfer means and the other path being adapted to convey the fluid from the supply tank to said discharge point without subjecting the fluid to said heat transfer means, and control mechanism operable to direct a flow of fluid along said one path and through said heat transfer means whenever due to temperature differential the volume of the unit quantity of fluid from the tank is less than that of a unit quantity of the fluid at atmospheric temperature.

6. In a fluid dispensing apparatus, the combination of a supply tank for fluid, mechanism connected with said tank for withdrawing fluid therefrom and delivering it to a dispensing point, said mechanism including a heat transfer chamber of substantial capacity, and a branch flow system including a passage for effecting a flow of fluid optionally in a path from one end of said chamber to the other and means providing a flow path directly into and out of said chamber, and means for directing the flow of fluid through one or the other of the flow paths depending upon the presence or absence, respectively of a temperature differential between the fluid as it leaves said supply tank and the atmosphere.

7. In a fluid dispensing apparatus, the combination of a supply tank for fluid, mechanism connected with said tank for withdrawing fluid therefrom and delivering it to a dispensing point, said mechanism including a heat transfer chamber of substantial capacity and a branch flow system including a passage affording a flow path for fluid from one end of said chamber to the other and another passage providing a flow path directly into and out of said chamber, and means for directing the flow of fluid through one path or the other including control means for adjusting the flow directing means operable conformable with the presence or absence of a temperature differential between the fluid as it leaves said supply tank and the atmosphere to pass fluid directly into and out of said chamber when the volume of the fluid being dispensed is at least as great as it would be at atmospheric temperature and for directing the flow of fluid from one end of the chamber to the other when the volume of the fluid being dispensed is less than it would be at atmospheric temperature.

8. In a fluid delivering apparatus, the combination of a flow system for conveying fluid from a source to a delivery point and including a branch conduit connected therewith, flow control means for directing fluid through said conduit or through said branch conduit, and thermally responsive means connected with said flow control means and operated by changes of temperature of fluid in said flow system for determining the position of said flow control means with respect to said conduit and branch conduit.

9. The method of dispensing fluid from a supply tank which includes the step of selectively delivering the fluid directly from the supply tank to a discharge point whenever the volume of the fluid is at least as great as that of the fluid at atmospheric temperature or diverting said fluid through a means for increasing the temperature thereof whenever the volume of the fluid being dispensed is less than that of the fluid at atmospheric temperature and thereafter delivering said fluid to said discharge point.

10. The method of dispensing fluid, which includes the steps of withdrawing the fluid from a source wherein the fluid is of lower than atmospheric temperature and thereby of reduced volume, and retaining the fluid in a heat transfer means prior to dispensing delivery thereof until the volume of the fluid has approximately reached its volume at atmospheric temperature.

11. The method of dispensing fluid from a supply tank, which includes the steps of withdrawing the fluid from a source wherein the liquid fluid is of lower than atmospheric temperature, retaining a quantity of the fluid in a heat transfer chamber prior to delivery thereof until the temperature of the fluid has approximately reached atmospheric temperature, and thereafter delivering said fluid from said chamber.

12. In a fluid dispensing apparatus, the combination of a supply tank for fluid, a pump, a closed chamber, means for connecting said pump with said chamber including a branch conduit connected with and discharging into the upper portion of said chamber, and a second branch conduit connected with the upper portion of said chamber and discharging into said chamber near the bottom thereof, automatically operable control mechanism for directing flow of fluid into the first mentioned branch when the volume per unit quantity of fluid from the tank is substantially the same as the volume of the same quantity of fluid at atmospheric temperature and into the second branch when the volume per unit quantity of fluid from the tank is less than the volume of the same quantity of fluid at atmospheric temperature, means within said chamber for imparting a circular motion to fluid discharged thereinto through either conduit whereby to facilitate the separation of gas from the fluid in said chamber, and an outlet duct leading from the upper portion of said chamber, said chamber being supported from the upper portion thereof and being fashioned for expansion under internal pressure and for efficient heat radiation.

13. In a fluid dispensing apparatus, a combination including a supply tank for the fluid, means connected with said tank for withdrawing fluid therefrom and delivering it to a dispensing point including a heat transfer chamber of substantial capacity supported from the upper portion thereof and being fashioned for expansion under internal pressure and for efficient heat radiation, and means operable automatically when due to a temperature differential between the liquid and atmosphere a given quantity of liquid from said source is of less volume than the same quantity at atmospheric temperature for directing the liquid into said heat transfer chamber before delivery to said dispensing point.

14. In a dispensing apparatus for a fluid the volume of which is materially affected by temperature variations, the combination of a fluid supply tank disposed substantially beyond the effects of atmospheric temperature variations, dispensing means for withdrawing the fluid from said tank and delivering the same to a discharge point, said means including a flow system through which said fluid may pass unaltered from its condition in said tank and in which the volume of the fluid may be increased by heat transference, and control means operable only when because of temperature differential the unit quantity of fluid is less than its equivalent at atmospheric temperature to establish a heat transferring relation in said flow system for eliminating said differential and thereby increasing to normal volume at the prevailing temperatures the fluid being dispensed.

15. The method of dispensing fluid from a supply tank to a discharge point which includes the step of increasing the temperature of the fluid as it is withdrawn to atmospheric temperature whenever the volume of said fluid in the tank would be greater at atmospheric temperature and thereafter delivering said fluid to said discharge point.

KENNETH C. ALLISON.